(No Model.)
I. E. STUMP.
CARPET SWEEPER.
No. 573,554. Patented Dec. 22, 1896.
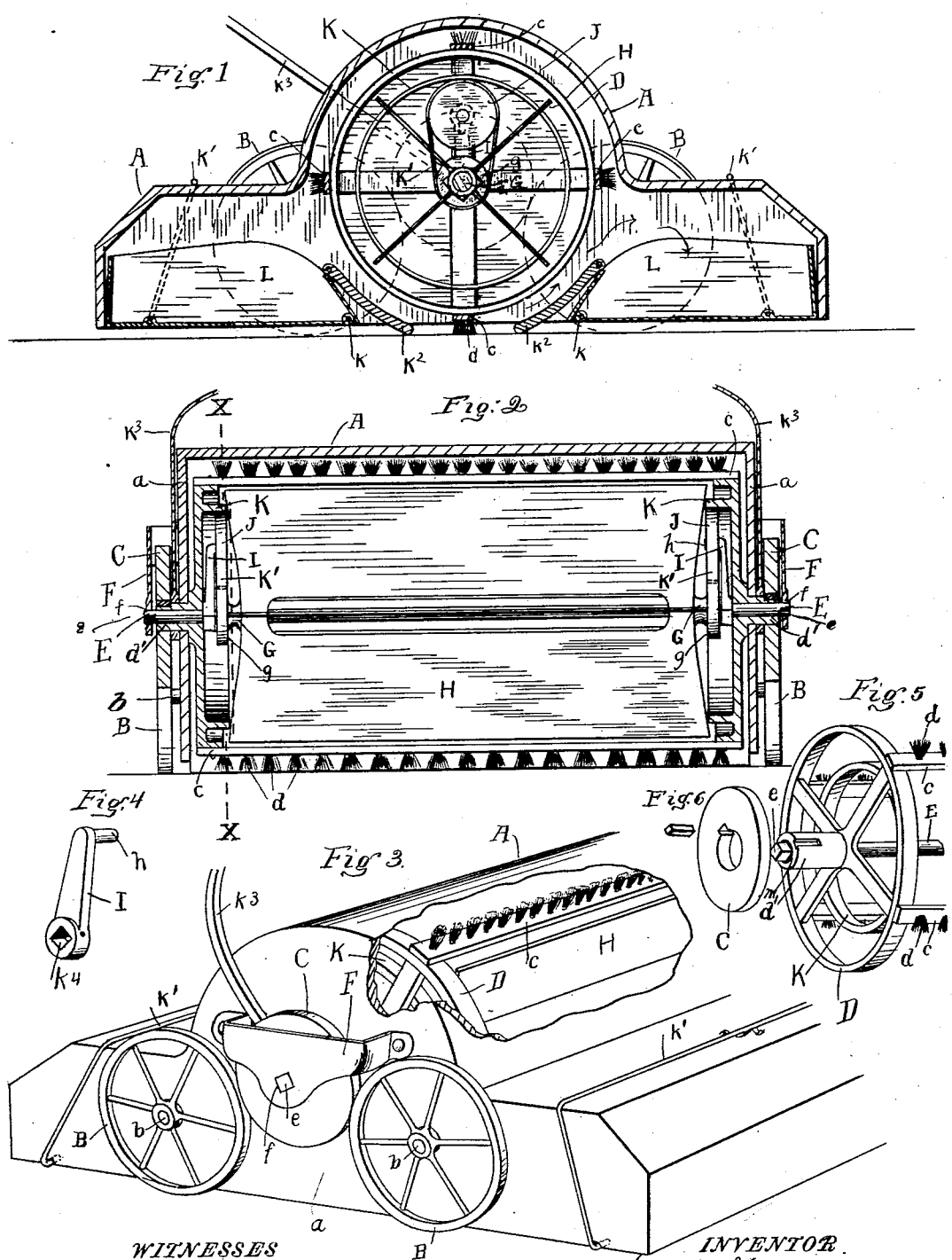
WITNESSES
C. I. Cross
Bertha Finch
INVENTOR
Ira E. Stump
By Fred W. Bond
Attorney

UNITED STATES PATENT OFFICE.

IRA E. STUMP, OF CANTON, OHIO, ASSIGNOR OF ONE-HALF TO JACOB M. SCHNEIDER, OF SAME PLACE.

CARPET-SWEEPER.

SPECIFICATION forming part of Letters Patent No. 573,554, dated December 22, 1896.

Application filed February 17, 1896. Serial No. 579,481. (No model.)

*To all whom it may concern:*

Be it known that I, IRA E. STUMP, a citizen of the United States, residing at Canton, in the county of Stark and State of Ohio, have invented certain new and useful Improvements in Carpet-Sweepers; and I do hereby declare that the following is a full, clear, and exact description of the same, reference being had to the annexed drawings, making a part of this specification, and to the letters of reference marked thereon, in which—

Figure 1 is a transverse section through line X X, Fig. 2. Fig. 2 is a sectional view showing the frictional rods, main frame, and end frames carrying the sweeper in section and the remaining parts in full lines. Fig. 3 is a perspective view showing a portion of the sweeper proper, also showing parts broken away to illustrate the sweeping-cylinder and fan. Fig. 4 is a detached view of one of the upper belt-wheel arms. Fig. 5 is a view showing a portion of the brush-cylinder, showing the fan removed. Fig. 6 is a detached view of the brush-cylinder-propelling wheel.

The present invention has relation to carpet-sweepers; and it consists in the different parts and combination of parts hereinafter described, and particularly pointed out in the claims.

Similar letters of reference indicate corresponding parts in all the figures of the drawings.

In the accompanying drawings, A represents the frame or body of the sweeper, which may be and preferably is of the form shown in the drawings. To the ends $a$ of the frame or body A are journaled the traveling wheels B by means of the pins $b$, which traveling wheels are located and arranged substantially as shown in the drawings. Between the traveling wheels B are located the wheels C, which wheels are so arranged with reference to the traveling wheels B that rotary motion will be communicated to the wheels C by means of the traveling wheels B.

Within the body or frame A is located a brush-cylinder which consists of the wheels D and the brush-bars $c$, said brush-bars being provided with suitable brush-bristles, such as $d$.

In the accompanying drawings four brush-bars are shown, but it will be understood that a greater or less number of brush-bars may be used or attached to the end wheels of the cylinder without departing from the nature of my invention.

The wheels D are provided with the hubs $d'$, to which hubs are securely attached in any convenient and well-known manner the wheels C, preferably by a key. The wheels D, together with their hubs, are mounted upon the stationary shaft or bar E, the extreme ends of which are provided with the angled portions $e$, said angled portions being for the purpose of entering the angled apertures $f$, formed in the brackets F, which brackets are securely attached to the ends $e$ of the frame or body A. Upon the shaft or bar E is mounted the hubs G or their equivalents, to which are attached the fan-blades H, but if desired the hubs G may be continued so as to form a hollow shaft. To the hubs G are attached the wheels $g$, said wheels being located and arranged substantially as shown in the drawings.

Between the wheels $g$ and the wheels D are located the arms I. The top or upper ends of the arms I are provided with the spindles $h$, which spindles are for the purpose of providing bearings for the wheels J. The arms I are held in proper position by means of the bar E. The wheels D are each provided with the flanges K, which flanges are for the purpose of communicating rotary motion to the belts K' and the wheels J, said parts being so located and arranged that the inner peripheries of the flanges K will press upon the belts K'. The belts K' extend downward and around the wheels $g$, which wheels are for the purpose of communicating rotary motion to the fan-blades H.

It will be understood that as the carpet-sweeper is passed over the carpet rotary motion will be imparted to the brush-cylinder and fan-blades H, said fan-blades having a more rapid rotary movement than that of the brush-cylinder, or, in other words, a differentiated rotary movement will be imparted to the brush-cylinder and fan-blades.

Within the body or frame A are located the dust-pans L, the inner ends of which are pivotally attached by means of the pivots $k$ or their equivalents. The dust-pans L are held in their normal positions by means of the bails $k'$, which bails are formed of such a size that they can be turned upward and onto the body A, as illustrated in Figs. 1 and 3. The bails $k'$ are connected to the dust-pans L and are formed so that when they are turned upward they will rest upon the body A and hold the dust-pans in an elevated position, and when the bails are released the dust-pans are free to turn upon their hinges. When it is desired to remove the dust from the dust-pan L, the bails $k'$ are removed or turned downward, which movement releases the dust-pans at their outer ends, at which time they are free to turn on their hinges.

For the purpose of conveying the dust to the dust-pan by means of the brushes $d$ and the fan-blades H the aprons $k^2$ are provided and are located directly in front of the inner sides of the dust-pans L. The aprons $k^2$ are pivoted to the ends $a$ of the frame or body A at their top or upper ends, thereby allowing the lower ends of said aprons to ride upon the carpet. The aprons $k^2$ are so adjusted with reference to the brushes $d$ that said brushes will sweep the aprons as they revolve, thereby carrying the dirt upward, and by the rapid rotation of the fan-blades the dust and dirt will be blown forward into the dust-pans L.

For the purpose of providing a handle for the carpet-sweeper proper the bars $k^3$ are provided, which bars are journaled at their bottom or lower ends to the hubs $d'$ between the ends $a$ and the wheels C, it being understood that the handle proper is to be attached to the bars $k^3$, which handle may be of the ordinary kind and attached in the ordinary manner.

For the purpose of holding the arms I in a fixed position they are provided with the angular apertures $k^4$, which angular apertures are located upon the angular portions of the shaft or bar E, said angular portions being located between the wheels D and $g$.

It will be understood that the shaft or bar E is to be formed round at the places where the hubs $d'$ are to be located, thereby allowing said hubs to revolve upon the shaft or bar E, and that said shaft or bar is to be formed round, so that the hubs G can revolve upon said shaft or bar E.

Having fully described my invention, what I claim as new, and desire to secure by Letters Patent, is—

1. In a carpet-sweeper the combination of a frame, a rotary brush-cylinder mounted therein, a rotary fan mounted within the brush-cylinder, and means for imparting rotary motion of different rapidity respectively to the brush-cylinder and the fan, substantially as and for the purpose specified.

2. In a carpet-sweeper, the combination of a frame provided with operating-wheels, a fixed shaft supported within the frame, a brush-cylinder mounted upon said shaft, friction-wheels attached to hubs on said cylinder adapted to contact with the operating-wheels, a rotary fan mounted upon said shaft and within said brush-cylinder, arms I, supported by said shaft and carrying pulleys J, which contact with the interior of the brush-cylinder, pulleys $g$, upon said fan and a belt connecting said pulleys, all arranged as described.

In testimony that I claim the above I have hereunto subscribed my name in the presence of two witnesses.

IRA E. STUMP.

Witnesses:
J. A. JEFFERS,
F. W. BOND.